June 3, 1941.  T. H. GUYON ET AL  2,244,193
METHOD AND APPARATUS FOR COOKING
Filed June 7, 1940
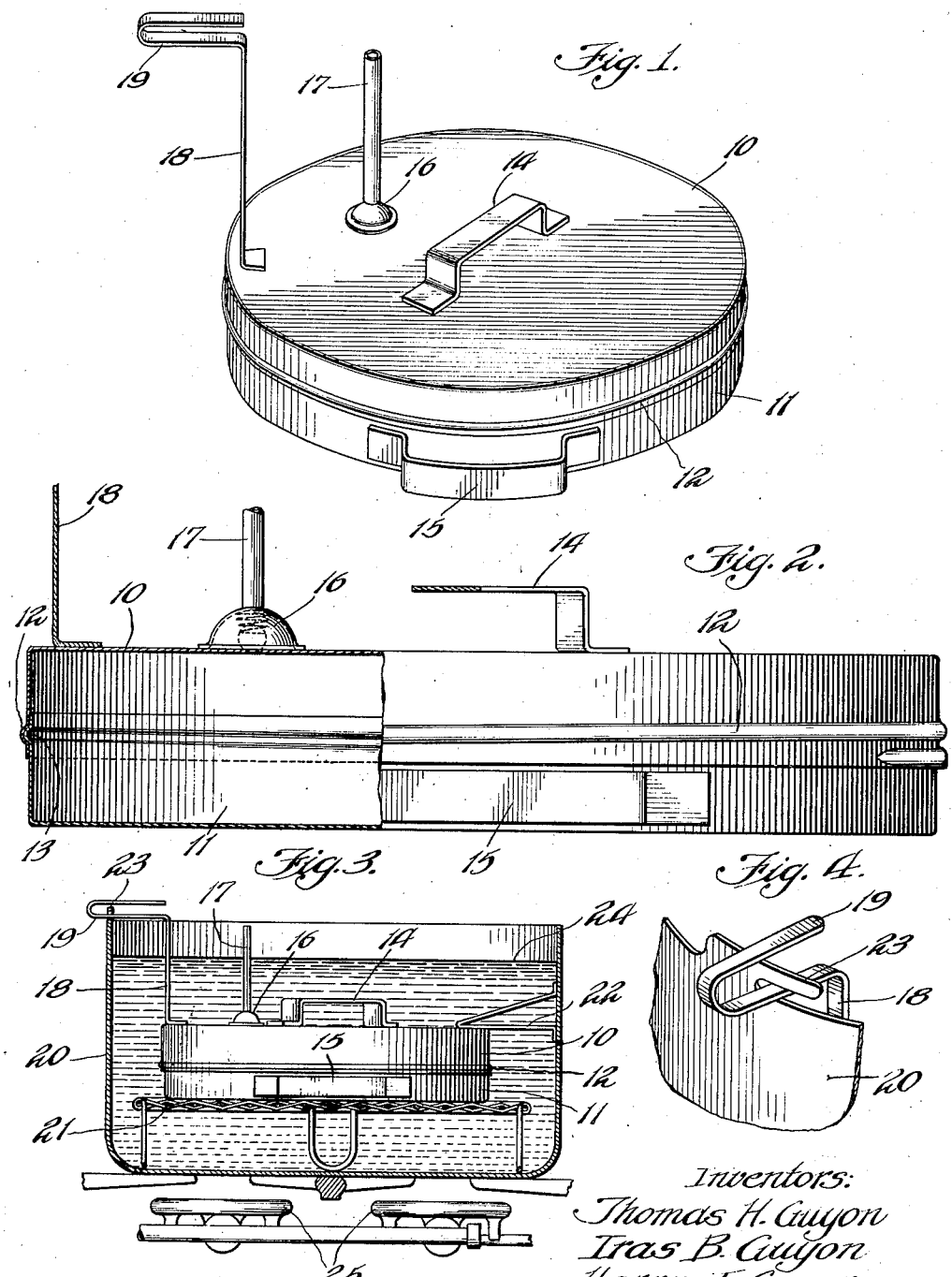
Inventors:
Thomas H. Guyon
Iras B. Guyon
Harry J. Guyon
BY Kent W. Worrell
ATTORNEY.

Patented June 3, 1941

2,244,193

UNITED STATES PATENT OFFICE 2,244,193

METHOD AND APPARATUS FOR COOKING

Thomas H. Guyon and Iras B. Guyon, Ogden, Utah, and Harry J. Guyon, Chicago, Ill.

Application June 7, 1940, Serial No. 339,240

9 Claims. (Cl. 53—21)

This invention relates in general to a method of cooking meats, fish, fowl, and other materials, by means of a thin-walled container submerged in a liquid, such as oil or the like, which is heated above the boiling point.

An important object of this invention is in the provision of a new and improved method of cooking in a closed container at a high heat but not under pressure, and in relieving pressure from the container so that the material cooked is softened, tenderized, does not shrink but actually puffs or fluffs up, producing a tasty and palatable food which is completely cooked in much less time than under the methods commonly employed at the present time.

A further object of the invention is in the provision of a cooking apparatus for carrying out this method which comprises a thin-wall metal container which is easily opened but need not be fluid-tight, and is provided with a discharge valve for relieving pressure from within the receptacle due to the heat of the liquid in which the receptacle is submerged for cooking.

A still further object of the invention is in the provision of a new and improved method of cooking which comprises the provision of a thin-wall container into which the material to be cooked is placed with a suitable amount of butter and immersed in a liquid heated well above the boiling point of water and left for a short time, depending upon the material and the heat of the cooking liquid so that satisfactory cooking can be effected by inexperienced help, and for cooking large quantities in a short space of time.

Other and further objects of the invention will appear in the specification and will be evident from the accompanying drawing in which, Fig. 1 shows a cooking receptacle in accordance with this invention;

Fig. 2 is a sectional view of the cooking unit shown in Fig. 1;

Fig. 3 is a view showing the cooking unit and means for submerging it in a cooking liquid; and Fig. 4 is a detail illustrating the attachment of the cooking unit as shown in Fig. 3.

In the ordinary cooking of meats, fish, fowl and the like, they are either fried, baked or grilled, which tends to shrink, harden or encrust the foods, or they are boiled or stewed in the presence of water or other liquid. The process in any case is long and tedious, it requires expert attention at all times, and accurate timing by an experienced cook in order to produce desirable or satisfactory results.

The present method overcomes all of these objections by providing a method so simple that it can be done by inexperienced help following the simplest directions, and producing highly satisfactory results in a much shorter space of time. This method comprises the provision of a cooking liquid heated well above the boiling point of water, from 375° to 425° F. being a satisfactory temperature, in placing the meat or other material to be cooked in a substantially-closed thin metal receptacle with a small amount of flavoring and cooking material such as butter, in immersing this closed receptacle in the hot liquid for a definite or predetermined time.

Referring now more particularly to the drawings, a satisfactory receptacle for accomplishing this cooking operation comprises a flat, hollow receptacle formed of thin sheet metal having a top 10 and a bottom 11 which fit tightly at the edges where they may be connected by screw threads 12 and 13 on the separate parts, or by any suitable clamping or fastening means which holds the parts together.

It is not necessary that the attachment of the threads or the other fastening means is entirely air-tight as the instant the receptacle is inserted within the hot cooking liquid a pressure is set up within the receptacle which tends to expel and prevent the entry of the cooking material so that when the cooking is in progress bubbles of air or steam are constantly discharging from the edges of the container. By having the walls of the container made of thin sheet metal, 24 gauge or thereabouts, heat is quickly conveyed to the contents of the container, thoroughly baking it and not tending to fry or boil it as would be the case with a thick metal receptacle.

In order to handle the container and to separate the parts a handle 14 is applied to the top and another handle 15 is applied to the lower edge of the bottom. By grasping these two handles or grips, usually protected by means of a pad or cloth, the parts may be separated even though highly heated.

At one side of the top where it does not interfere with the handle is a discharge valve 16 with a discharge tube 17 leading upwardly therefrom to a sufficient height so that when the receptacle is immersed in a cooking liquid the upper end of the tube will be above the level of the cooking liquid. Also attached to and projecting upwardly from the top is a holder 18 having a bent extremity 19 forming a handle by means of which the receptacle may be inserted into and raised from the cooking liquid.

In carrying out the method of this invention, a hot liquid pot or container 20 may be provided for each cooking unit or receptacle or this container may be of sufficient length to receive a plurality of such cooking units. Any suitable means may be employed for holding each cooking unit submerged in the hot liquid with a space around the unit for free movement of the cooking liquid. A suitable arrangement as shown in Figs. 3 and 4 comprises a supporting rack or grid 21 spaced from the bottom of the cooking receptacle with a ledge or projection 22 at one side under which one edge of the cooking unit is inserted by means of the opposite handle 18 and the hand grip is then engaged underneath a lip or projection 23 at the opposite side of the receptacle 20, the height of a cooking liquid 24 extending well above the top 10 of the cooking receptacle so that it is entirely surrounded by the cooking liquid during the cooking operation. The liquid in the container 20 is kept at a suitable or predetermined heat by any suitable burner 25.

In order to remove the cooking unit from the liquid container, the handle 19 is simply disengaged from the catch 23, the container is raised from the cooking liquid, and the top is removed from the bottom of the container so that the contents in the bottom section are freely accessible for eating or by removal therefrom.

Any suitable liquid such as oils, fats, grease, or even mineral oil, may be used for the cooking liquid 24 as this liquid does not come in contact with the food at any time, the heating of the liquid tends to prevent it from entering the closed cooking receptacle, and the pressure within the receptacle excludes the liquid from the receptacle at all times during the cooking operation. When the receptacle is removed from the cooking liquid it may be necessary to shake or wipe the cooking liquid from the outside of the container.

Butter which is cooked with the contents of the receptacle blends with meats, fish, fowl, or other foods, it makes a gravy or sauce and the food is permeated with a pleasing butter-baked flavor which distinguishes the food cooked in this manner from other methods of cooking, tenderizing and softening the food, causing it to be uniformly cooked throughout and even chopped meats such as hamburger, are fluffed or puffed out by this cooking rather than in the flat, hard, fried cakes as usually served. Thus a distinctive and pleasing flavor is imparted to foods cooked in this manner.

We claim:

1. The method of cooking which comprises enclosing material to be cooked in a thin metal receptacle, and in immersing it in a liquid heated well above the boiling point of water and approximately to 375° F. or more, and in venting the interior of the receptacle to the atmosphere during the cooking.

2. The method of cooking which comprises enclosing material to be cooked in a thin substantially-airtight metal receptacle, in immersing it in a liquid heated well above the boiling point of water and not less than 375° F., and in allowing the vapor produced by the heat of the liquid to escape from the receptacle.

3. The method of butter-baking food materials which comprises applying a predetermined quantity of butter to a food to be cooked in a thin metal, substantially airtight receptacle, in immersing it in a liquid heated to a temperature of around 375° to 425° F. for a few minutes, depending upon the material cooked, in constantly relieving and allowing the escape of vapor under pressure which arises from the food, from the receptacle, and in thereby allowing the butter to melt and permeate the food to impart a distinctive flavor thereto.

4. The method of cooking which comprises enclosing material to be cooked in a thin-walled receptacle, immersing it in a liquid heated well above the boiling point of water and above 375° F., in relieving the pressure from within the receptacle by allowing vapor from the material cooked to escape from the receptacle, and withdrawing the receptacle from the liquid after a predetermined time and exposing the cooked material ready for use.

5. The method of cooking foods such as steak, fish, and fowl, which comprises enclosing such foods in a substantially airtight container, in submerging the container in a liquid heated to approximately 400 degrees for different periods depending upon the material cooked, in allowing the pressure due to vapor arising from the material cooked to escape from the receptacle and to pass out of the liquid in which it is cooked, and in removing the receptacle from the cooking liquid and exposing the material cooked after a predetermined time, depending upon the material.

6. In an apparatus for submerged liquid cooking, a thin metal receptacle having top and bottom parts which are secured together to enclose a material to be cooked, a liquid and a container therefor adapted to be heated to approximately 400 degrees without vaporizing the material, and means in the container and on the receptacle for holding the receptacle in an immersed position within the liquid.

7. In an apparatus for cooking, a thin sheet metal receptacle comprising separable pieces for enclosing a material to be cooked, means on the said pieces for facilitating their attachment and disengagement, a one-way valve for discharging vapor under pressure from within the receptacle, and a container for hot liquid into which the receptacle is inserted for cooking material therein.

8. In an apparatus for cooking by immersion, a thin metal receptacle having separable parts which fit closely together but not airtight, a container for hot liquid in which the receptacle is immersed, the receptacle having a holder adapted to project above the surface of the liquid when the receptacle is immersed, and the container having means for engaging the receptacle at one side and the holder at the top of the container at the other side for releasably holding the receptacle in immersed position in the container.

9. In an apparatus for cooking by immersion, the combination with a thin metal receptacle for receiving material to be cooked, the metal receptacle comprising parts secured together, but not airtight, means for attaching and disconnecting the parts, a discharge valve in connection with the receptacle for vapors under pressure therefrom, a holder projecting upwardly and outwardly at one side of the receptacle, and a container for hot liquid having a support therein for the receptacle, a ledge at one side of the container under which one edge of the receptacle is inserted for holding it on the support in the container, and means at the opposite side of the container for releasably engaging the projecting portion of the holder of the receptacle for holding the receptacle in an immersed position within the container so that the hot liquid is free to pass entirely around it.

THOMAS H. GUYON.
HARRY J. GUYON.
IRAS B. GUYON.